(12) United States Patent
D'Agostino

(10) Patent No.: US 9,504,267 B2
(45) Date of Patent: Nov. 29, 2016

(54) METHOD AND APPARATUS FOR DISPENSING FROZEN CONFECTIONS

(71) Applicant: Conopco, Inc., Englewood Cliffs, NJ (US)

(72) Inventor: Tommaso D'Agostino, Rushden (GB)

(73) Assignee: CONOPCO, INC., Englewood Cliffs, NJ (US)

( * ) Notice: Subject to any disclaimer, the term of this patent is extended or adjusted under 35 U.S.C. 154(b) by 27 days.

(21) Appl. No.: 14/378,987

(22) PCT Filed: Feb. 13, 2013

(86) PCT No.: PCT/EP2013/052875
§ 371 (c)(1),
(2) Date: Aug. 15, 2014

(87) PCT Pub. No.: WO2013/124193
PCT Pub. Date: Aug. 29, 2013

(65) Prior Publication Data
US 2015/0335042 A1  Nov. 26, 2015

(30) Foreign Application Priority Data
Feb. 24, 2012  (EP) ..................................... 12156786

(51) Int. Cl.
*B65D 35/28* (2006.01)
*A23G 9/28* (2006.01)
*A23G 9/22* (2006.01)

(52) U.S. Cl.
CPC .............. *A23G 9/281* (2013.01); *A23G 9/227* (2013.01); *A23G 9/28* (2013.01)

(58) Field of Classification Search
CPC ...... A23G 9/227; A23G 9/322; A23G 9/288; A23G 9/287; A23G 9/24

USPC ................ 222/94, 95, 146.6, 419, 394, 399; 426/515, 524

See application file for complete search history.

(56) References Cited

U.S. PATENT DOCUMENTS 1,685,250 A    9/1928  Key
2,950,606 A    8/1960  Maddux
(Continued)

FOREIGN PATENT DOCUMENTS

EP   0176468 A2    4/1986
EP   0545678 A2   12/1992
(Continued)

OTHER PUBLICATIONS

Search Report in EP11158477, Sep. 28, 2011.
(Continued)

*Primary Examiner* — Lien Ngo
(74) *Attorney, Agent, or Firm* — Foley & Lardner LLP

(57) ABSTRACT

A method for dispensing a frozen confection is provided the method comprising: providing a refrigerated, insulated chamber, which houses at least one container, containing a frozen confection at a temperature of −12° C. or below; wherein the at least one container has an outlet which is closed by a self-closing valve; wherein the container comprises flexible bag containing the frozen confection located inside a bottle; pressurizing gas in the region inside the bottle and outside the flexible bag thereby applying pressure to the frozen confection so that the valve opens and the frozen confection is forced out of the container through the outlet; releasing the pressure so that the valve closes. An apparatus is also provided.

7 Claims, 8 Drawing Sheets

(56) References Cited

U.S. PATENT DOCUMENTS

| | | | |
|---|---|---|---|
| 4,566,612 A * | 1/1986 | von Kreuter | A23G 9/28 137/846 |
| 4,707,997 A | 11/1987 | Bigler et al. | |
| 5,048,724 A | 9/1991 | Thomas | |
| 5,096,092 A * | 3/1992 | Devine | B67D 1/0462 222/105 |
| 5,150,820 A * | 9/1992 | McGill | A23G 3/28 222/146.6 |
| 5,265,764 A | 11/1993 | Rowe et al. | |
| 5,361,941 A | 11/1994 | Parekh et al. | |
| 5,405,054 A * | 4/1995 | Thomas | A23G 3/28 222/105 |
| 5,463,878 A | 11/1995 | Parekh et al. | |
| 6,435,377 B1 | 8/2002 | Iwata et al. | |
| 9,241,501 B2 * | 1/2016 | Broadbent | A23G 9/28 |
| 2006/0255066 A1 * | 11/2006 | Kannar | A23G 9/045 222/145.3 |
| 2007/0108224 A1 | 5/2007 | Campbell et al. | |
| 2008/0105711 A1 * | 5/2008 | Kirimli | B67D 1/0462 222/209 |
| 2008/0272154 A1 | 11/2008 | Maas et al. | |
| 2010/0154644 A1 * | 6/2010 | Skalski | A47J 31/0668 99/275 |

FOREIGN PATENT DOCUMENTS

| | | |
|---|---|---|
| EP | 1186239 A1 | 3/2002 |
| EP | 1400486 A1 | 3/2004 |
| EP | 1862426 | 12/2007 |
| EP | 2151168 A1 | 2/2010 |
| WO | WO9101090 | 2/1991 |
| WO | WO9705055 | 2/1997 |
| WO | WO03096821 | 11/2003 |
| WO | WO2004026756 A1 | 4/2004 |
| WO | WO2007039158 | 4/2007 |

OTHER PUBLICATIONS

Written Opinion in EP11158477, Sep. 28, 2011.
PCT International Search Report and PCT Application PCT/EP2013/052875 dated Feb. 13, 2013 with Written Opinion.
European Search Report in EP Applicaiton No. EP12156786 dated Jul. 12, 2012 with Written Opinion.

* cited by examiner

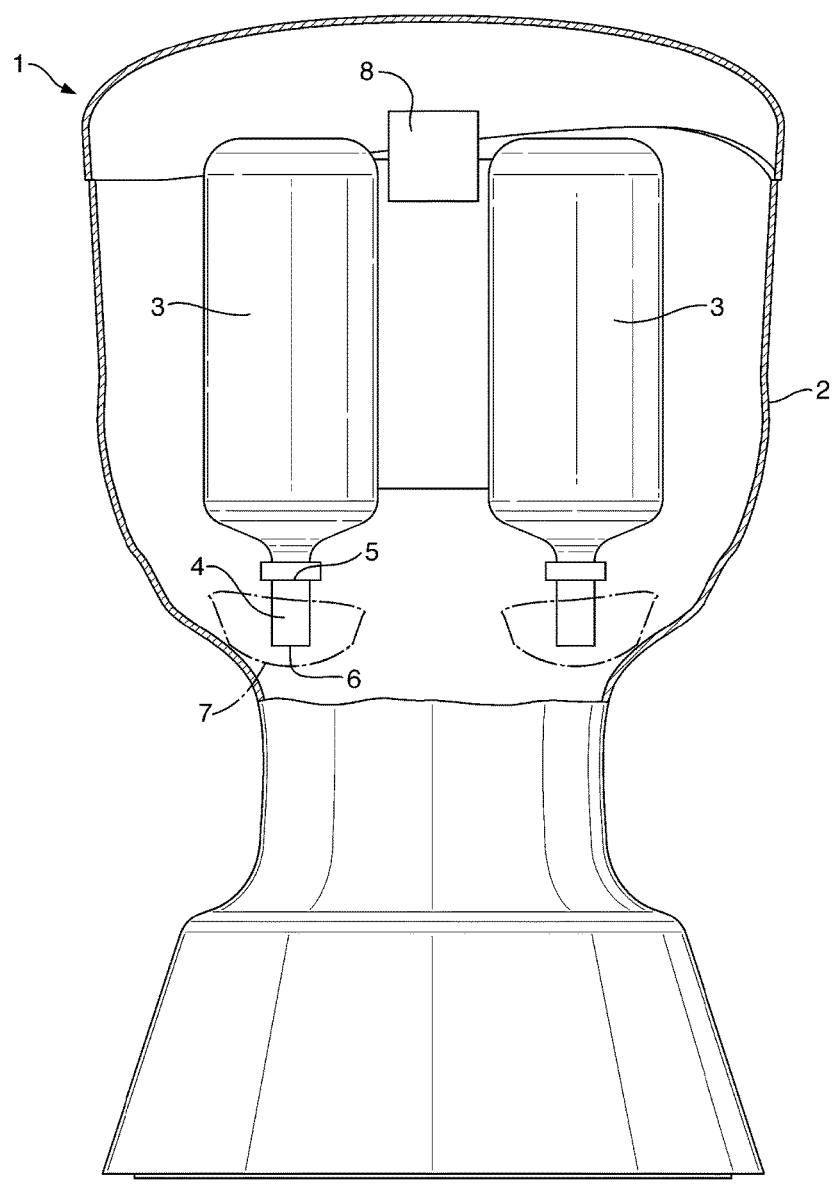

METHOD AND APPARATUS FOR DISPENSING FROZEN CONFECTIONS

TECHNICAL FIELD

This invention relates to a method and apparatus for dispensing frozen confections, such as soft ice cream.

BACKGROUND

Soft ice cream is normally dispensed at the point of sale from a soft serve ice cream machine, i.e. a semi-continuous, pressurised scraped surface heat exchanger in which a pre-packaged mix is frozen and aerated. It is typically dispensed at temperatures of −4 to −8° C., for example into a cone, and is then immediately consumed. It is liked by many consumers because of its texture, which is softer than that of ice cream served by scooping from a container kept in a freezer cabinet at around −18° C. Soft serve ice cream machines have a number of disadvantages: they are large and expensive, require training to operate, consume considerable energy, do not deliver consistent product quality if used over a period of time and are inconvenient for the operator to dismantle and clean. Each machine can also only offer one type of product (e.g. flavour/ice cream/sorbet etc) at a time—separate freezer barrels are required for different products.

In recent years, systems for dispensing soft ice cream have been developed in which pre-packaged ice cream is delivered from a container by a dispensing apparatus. US 2006/255066 discloses a dispensing apparatus containing a pressure-displacement device that forces the food (such as soft ice cream) out of its container. The container is located within a chamber which keeps the ice cream at a specified temperature between −6 and −24° C. A plunger is used to push the ice cream out of the container through a self-closing valve.

Nonetheless, there remains a need for an improved system for dispensing soft ice cream. More particularly, such improved system must allow for consistent good quality dispensing irrespective of:
the temperature of the ice cream which, even a well controlled cabinets, can range from −16° C. and −21° C., leading to huge viscosity variations
the composition/flavour of the ice cream which again leads to significant rheological changes, even at constant temperature.

BRIEF DESCRIPTION OF THE DRAWINGS

FIG. 1 shows an apparatus, according to an exemplary embodiment of the present application.

BRIEF DESCRIPTION OF THE INVENTION

Figure 2A:
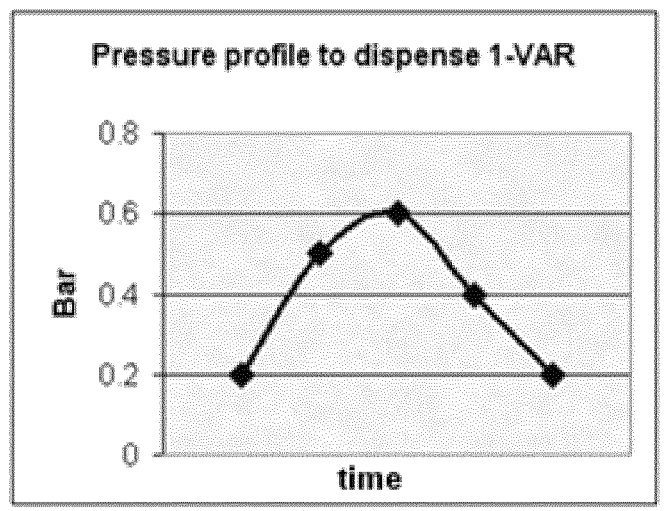
FIG. 2a shows a first plot of variable pressure at −16° C., according to an exemplary embodiment of the present application.

We have now developed a method and apparatus which overcomes the problems of previous dispensers. Accordingly, in a first aspect, the present invention provides a method for dispensing a frozen confection, the method comprising:
providing a refrigerated, insulated chamber, which houses at least one container, containing a frozen confection at a temperature of −12° C. or below; wherein the at least one container has an outlet which is closed by a self-closing valve; wherein the container comprises a flexible bag containing the frozen confection located inside a bottle;
pressurising gas in the region inside the bottle and outside the flexible bag thereby applying pressure to the frozen confection so that the valve opens and the frozen confection is forced out of the container through the outlet;
releasing the pressure so that the valve closes.
wherein the pressure applied to the frozen confection is varied by the operator during dispensing
Preferably the frozen confection is ice cream.
Preferably the refrigeration system is capable of maintaining the chamber and its contents to a temperature of below −15° C. More preferably the outer end of the nozzle is kept at a temperature below −13° C. when the cap is in its closed position.
Preferably the self-closing valve is a slit valve made from a resilient material.
In a second aspect, the present invention provides an apparatus for dispensing a frozen confection, the apparatus comprising:
A refrigerated, insulated chamber, which houses at least one container, suitable for containing a frozen confection at a temperature of −12° C. or below;
the at least one container comprising a flexible bag for containing the frozen confection located inside a bottle having an outlet which is closed by a self-closing valve;
means for pressurising gas in the region inside the bottle and outside the flexible bag thereby applying pressure to the frozen confection so that the valve opens and the frozen confection is forced out of the container through the outlet.
wherein the means for applying pressure to the frozen confection allows the operator to vary the applied pressure during dispensing.
Preferably the refrigeration system is capable of maintaining the chamber and its contents to a temperature of below −15° C.

Preferably the self-closing valve is a slit valve made from a resilient material.

DETAILED DESCRIPTION OF THE INVENTION

The present invention will now be described with reference to the figures, wherein:

FIG. 1 shows an apparatus according to the invention.

FIG. 1 shows an apparatus according to the invention. The apparatus 1 comprises an insulated chamber 2, which houses one or more containers 3 of a frozen confection such as ice cream. In the embodiment shown in FIG. 1 there are two such containers. A refrigeration system 8 cools the chamber and its contents to a temperature of −12° C. or below. The refrigeration system is typically a conventional such system, having a compressor, cooling coils and a fan for circulating the cooled air. The refrigeration system is designed to allow cold air to flow around the container in the insulated chamber, in order to keep the ice cream at the correct temperature (e.g. −18° C.). The apparatus also comprises means for applying pressure to the frozen confection thereby to urge the frozen confection from the container (not shown in FIG. 1).

The insulated chamber 2 is a chamber having insulated walls which preferably comprise a heat insulating material having a thermal conductivity in the range of 0.5 to 50 mWm$^{-1}$K$^{-1}$. Typically, the container has 6 sides (top, bottom, front, back, left and right), with rounded faces, edges and corners, although other shapes and configurations are possible. The top and bottom sides may be sloping. The insulated walls may be constructed from an insulating material encased between sheets of a material such as fibreglass, metal or plastic. The insulating material can be, for example, a closed cell foam structure such as expanded polystyrene; foam rubber, such as elastomeric nitrile rubber insulation (which has a thermal conductivity of around 30 mW m$^{-1}$K$^{-1}$); rigid foams, such as polyurethane; a fibrous material, such as fibreglass; a vacuum sealed within a double walled container; or vacuum insulated panels, which are typically made of an open cell foam or granular structure which is enveloped and hermetically sealed into a gas-impervious film under very low pressure. These panels have a thermal conductivity of around 5 to 10 mW m$^{-1}$K$^{-1}$. Different insulating materials can be used to construct different parts of the container. The walls are usually 5-50 mm thick, typically about 25 to 50 mm.

The containers 3 are "bag in bottle" containers, where the frozen confection is located in a flexible bag inside a rigid bottle. WO 07/039158 describes this type of container. The pressure is applied to the frozen confection by increasing the pressure of the gas in the region outside the bag but inside the bottle. In this way pressure is applied over a large surface area of the bag which contains the frozen confection, so that the force on the frozen confection is substantially directed towards the outlet of the bag, which communicates with the outlet of the bottle. This has the effect that gagging of the bag in the outlet is avoided so very little frozen confection is wasted by becoming trapped as the bag empties. Moreover the air pressure can be increased gently, with a high degree of control so as to obtain a good flow, in comparison to applying pressure to ice cream in a cartridge by means of a piston. Since air is compressible it acts as a cushion. This provides very good control over the dispensing rate, compared for example to a system wherein pressure is applied to the frozen confection by means of a piston. The pressure may be applied for example by using an external source of compressed air such as a pump and/or buffer tank. When the pressure is released after dispensing a portion of ice cream, the bag is able to expand back into the free space inside the bottle. The pressure may be decreased in a controlled manner or simply released quickly.

A nozzle 4 is attached to each container. The inner end 5 of the nozzle is connected to the outlet of the container 3 and is located inside the insulated chamber 2. The outer end 6 of the nozzle is located outside the insulated chamber. A cap 7 can move between a closed position, wherein the outer end of the nozzle is enclosed between the cap and the outside of the chamber, and an open position which allows external access to the outer end of the nozzle. In FIG. 1 the cap is shown in the closed position, thus enclosing a region around the outer end of the nozzle. The cap 7 is designed to minimise heat ingress into this region. Preferably the inside of the cap comprises a layer of insulating material and has a gasket (e.g. made from silicone) which seals the cap against the outside of the chamber when the cap is in the closed position and therefore prevents air flow into the enclosed region around the end of the nozzle, thus keeping it cold.

Preferably the self-closing valve is formed from a slit valve, i.e. a piece of resilient material (such as silicone rubber) which has two or more slits which cross each other. The resilient nature of the material has the result that a threshold pressure is required to open the slits, allowing the frozen confection to flow out. Once the pressure is returned to ambient, the valve closes itself in a self-sealing manner. Thus the valve forms a ventricle which opens under the pressure of the frozen confection pushing against it when pressure is exerted by the gas inside the bottle on the frozen confection inside the flexible bag. Similarly, the valve closes and cuts the stream of frozen confection when the pressure is released. Such self-closing slit valves are well known (see for example EP 0545678 and WO 97/05055 amongst many others). They have been used for example in squeezable containers for mayonnaise or tomato ketchup. However, these typically have an outlet of no more than 5 mm in diameter. In the present invention, the slit valve is for a larger aperture, such as 2 to 4 cm in diameter.

The method and apparatus of the invention have several advantages over previous systems. By having a self-closing valve, dispensing can be controlled by means of the pressure applied to the frozen confection, and does not require any active control of the nozzle, e.g. by means of a valve which is opened and closed by the operator to start and finish dispensing. By using the variable gas pressure to control dispensing, very precise control is achieved. It also offers improved hygiene because the valve is very simple and does not have regions wherein frozen confection can become trapped.

Moreover, we have found that the combination of this type of valve, the variable gas pressure and the bag in bottle container together with dispensing the ice cream at a lower temperature than has typically previously been used in this sort of system results in a very attractive product shape. The valve slits form flutes in the ice cream (as it is known to do with shaping nozzles on conventional soft ice cream machines for example). However, because the frozen confection is at a temperature of −12° C. or below, it is much more solid-like than normal soft ice which is dispensed at around −5° C. The resulting flutes therefore have better definition and do not collapse soon after dispensing, as happens with conventional soft ice cream. They also have an attractive smooth, matt surface appearance. In fact, by careful positioning of the receptacle into which the ice cream is dispensed (e.g. a cone) a very attractive folded/convoluted configuration can be produced in the ice cream flutes. The fine degree of flow modulation provided by using air pressure to dispense the ice cream is very important in delivering a product with an attractive appearance.

Preferably the valve and surrounding area is kept at a temperature of below −13 C.°. Whilst, for microbiological reasons it would be expected that the valve should be kept at a temperature of no higher than −6° C., we have further found that by keeping the frozen confection in the container adjacent to the valve at a lower temperature than would have been thought necessary, then the combination of the solid-like nature of the ice cream and the self-closing valve prevents drips of ice cream from leaking. Thus the self-closing valve is sufficient in itself both to regulate the flow of ice cream during dispensing, and also to close the container and thus prevent any leaks between dispensing operations.

The required temperature can be achieved for example by having a cap which covers the valve and the end of the container between dispensing operations. Preferably cold air from the chamber which houses the container is circulated around the valve in the space enclosed by the cap.

The means for applying pressure to the frozen confection allows the operator to vary the applied pressure (for example the pressure applied is determined by the extent to which an operating lever is pulled by the operator as with a "beer tap"). This gives good control over the rate of dispensing of the frozen confection, which results in products that have an attractive appearance.

EXAMPLES

An ice cream (100% overrun) was prepared according to the formulation in the table below, using a conventional process.

| Ingredient | Weight % |
|---|---|
| Skimmed milk powder | 4.15 |
| Whey protein concentrate 30% | 2.76 |
| Sucrose | 2 |
| Dextrose monohydrate | 19.4 |
| Glucose syrup LF9 63DE, 78% dry matter | 10 |
| Coconut oil | 8 |
| Emulsifier HP60 | 0.4 |
| Locust bean gum | 0.25 |
| Vanilla flavour | 0.03 |
| Water | To 100 |

The ice cream was filled into a bag in bottle container (as described in WO 07/039158) and stored at −18° C. overnight. It was dispensed into a cone using the method and apparatus of the invention having a silicone rubber valve having three slits of about 27 mm in length.

Figure 2B:
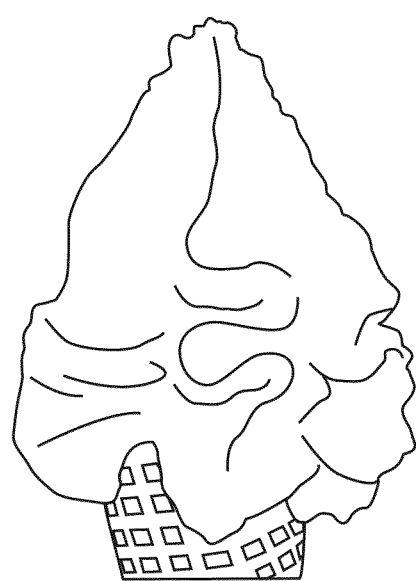
FIG. 2b shows an extruded ice cream having good extrusion quality at −16° C.
Figure 3:
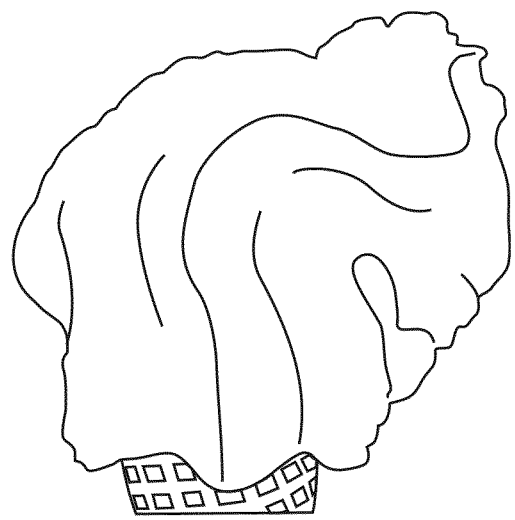
FIG. 3 shows an extruded ice cream at a pressure of 2 Bar at −16° C.

As a comparison, the ice cream was also filled into a cylindrical container approximately 100 mm in diameter. The container had an outlet at one end fitted with an identical silicone slit valve. The ice cream was dispensed from the container through the slit valve and into a cone by applying pressure with a piston. Thus this dispensing system is similar to that disclosed in US 2006/255066. It was found to be difficult to control the flow of the ice cream, even though the pressure applied to the piston could be varied. With the piston it was not possible to modulate the flow with the same degree of control as could be achieved with the air pressure system. The dispensed ice cream is shown in FIG. 3. The ice cream is much less attractive than that shown in FIG. 2. In particular the flutes/folds are much less regular, and the ice cream does not have a peak.

The various features of the embodiments of the present invention referred to in individual sections above apply, as appropriate, to other sections mutatis mutandis. Consequently features specified in one section may be combined with features specified in other sections as appropriate. Various modifications of the described modes for carrying out the invention which are apparent to those skilled in the relevant fields are intended to be within the scope of the following claims.

Figure 4:
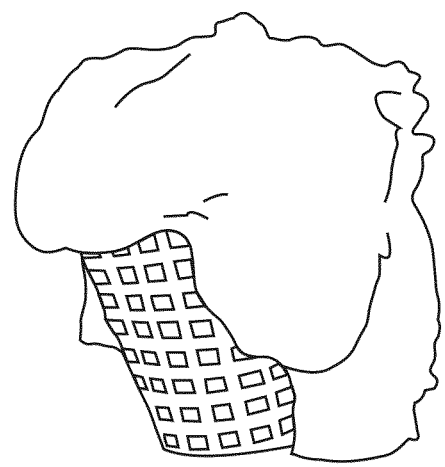
FIG. 4 shows an extruded ice cream at a pressure of 1.8 Bar at −16° C.
Figure 5:
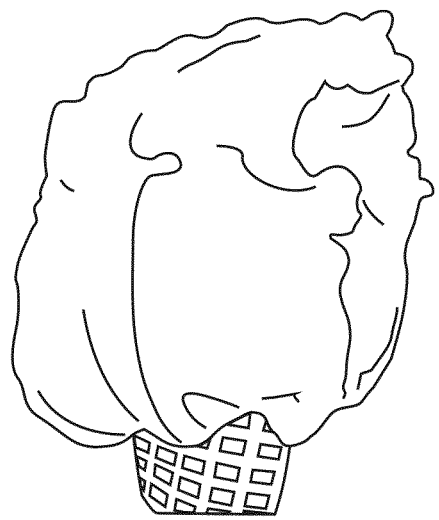
FIG. 5 shows an extruded ice cream at a pressure of 1.6 Bar at −16° C.
Figure 6:
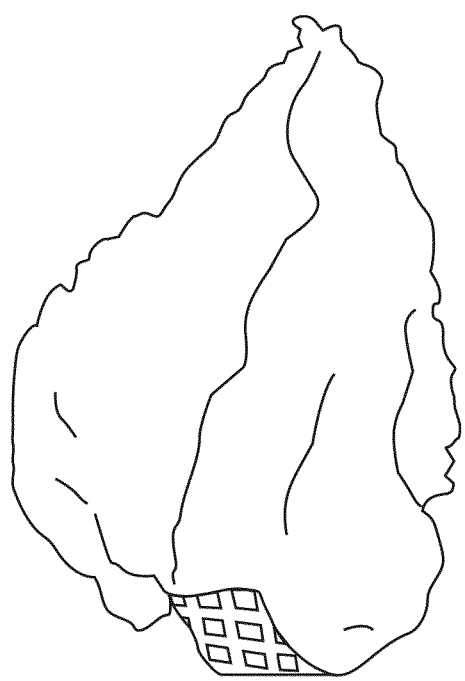
FIG. 6 shows an extruded ice cream at a pressure of 1.4 Bar at −16° C.
Figure 7:
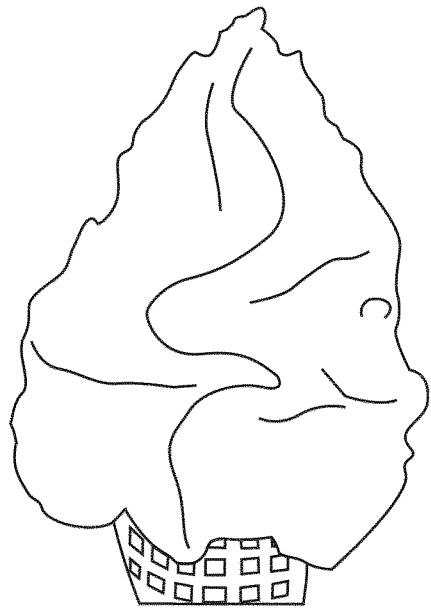
FIG. 7 shows an extruded ice cream at a pressure of 1.2 Bar at −16° C.
Figure 8:
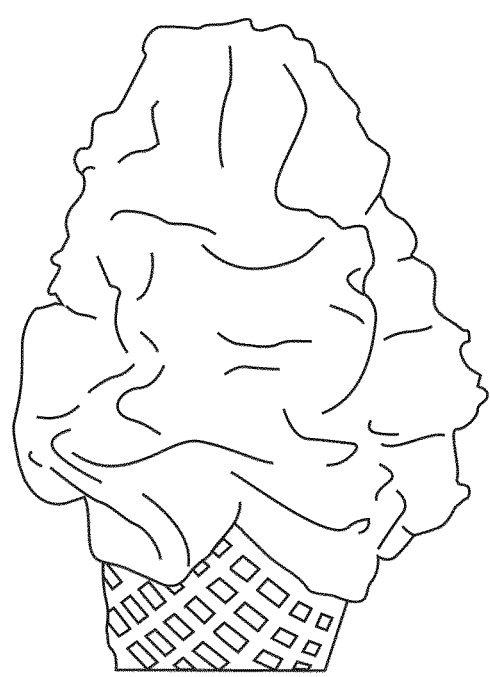
FIG. 8 shows an extruded ice cream at a pressure of 0.8 Bar at −16° C.
Figure 9A:
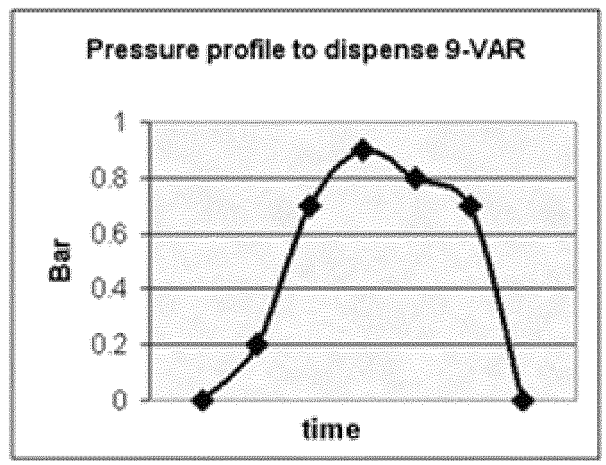
FIG. 9a shows a second plot of variable pressure at −20° C., according to an exemplary embodiment of the present application.
Figure 9B:
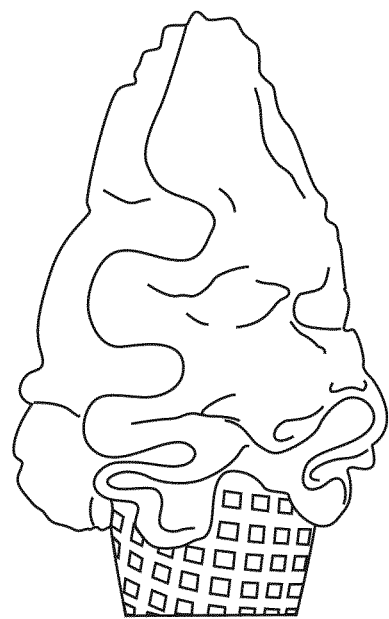
FIG. 9b shows an extruded ice cream having good extrusion quality at −20° C.
Figure 10:
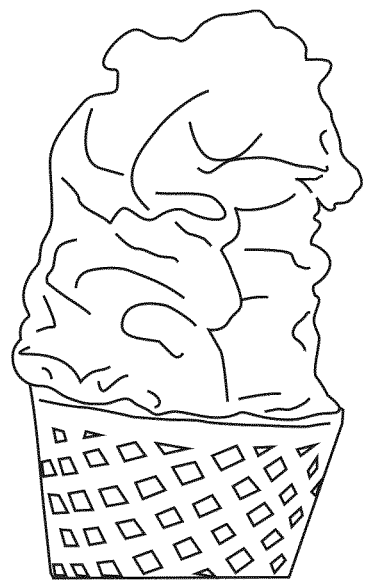
FIG. 10 shows an extruded ice cream at a pressure of 0.8 Bar at −20° C.
Figure 11:
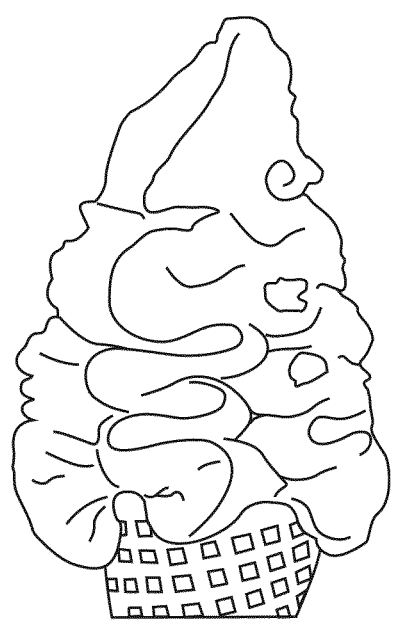
FIG. 11 shows an extruded ice cream at a pressure of 1.2 Bar at −20° C.
Figure 12:
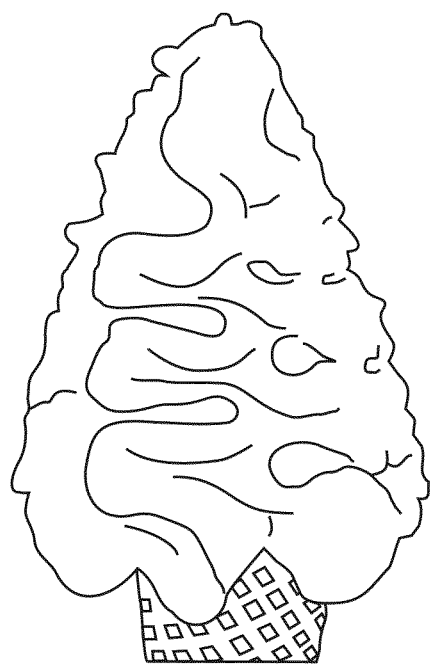
FIG. 12 shows an extruded ice cream at a pressure of 1.8 Bar at −20° C.

The ice cream was then dispensed at constant pressure and at variable pressure.
Variable Pressure:
The pressure was varied during the dispensing. The pressure level was recorded.
Constant Pressure:
The pressure was set to a set point.
Temperature controlled cabinets were set to temper for at least 48 hours bottles at the temperature of −16 and −20° C.
The bottle temperature was tested before testing with a calibrated temperature probe inserted in the ice cream.
2012 silicon flexible valve and bottles were used for these all these tests.
Experiments at −16° C.
Variable Pressure:
At this temperature the ice cream is very soft. Variable pressure (as plotted in FIG. 2a) ensures good control and extrusion quality as shown in FIG. 2b.
Constant Pressure (Examples):
At this temperature the ice cream is very soft. There is a poor control when setting to 2 Bar. The flow is too fast and it is not possible to achieve quality extrusion (as shown in FIG. 3)
There is also poor control when setting to 1.8 Bar. The flow is still too fast, it is not possible to achieve quality extrusion (as shown in FIG. 4). Even smaller portion becomes very fluid and collapses.
There is still poor control when setting to 1.6 Bar. The flow is still very fast there is marginal flow control improvement, but still clearly unacceptable (FIG. 5).
There is still poor control when setting to 1.4 Bar. The flow is still very fast, there is marginal flow control improvement, but still clearly unacceptable (FIG. 6).
There is still poor control when setting to 1.2 Bar. The flow is a bit fast, the quality improves but still not top extrusion quality (FIG. 7).
It is only at when control pressure setting to 0.8 Bar that flow speed better and extrusion becomes good (FIG. 8).
Experiments at −20° C.
Variable Pressure:
At this temperature the ice cream is much stiffer. Again, the variable pressure (FIG. 9a) allows the operator to naturally find the optimum pressure and to modulate it so to the deliver the best possible extrusion (FIG. 9b).
Constant Pressure
At 0.8 Bar pressure the flow is too slow. It is not possible to create a pleasant extrusion even by moving the cone sideways. Clearly extrusion is not acceptable (FIG. 10).
As the pressure was increased to 1.2 Bar it became possible to achieve a better extrusion (FIG. 11).
At 1.4 Bar, a good quality product was achieved.
As the pressure was increased to 1.8 Bar, the flow became too fast and operator could not dispense a good looking portion using the constant pressure (FIG. 12).

RESULTS DISCUSSIONS AND CONCLUSIONS

It's very clear from the data presented that keeping constant pressure during the extrusion, without presetting it at the exact optimal range, produces very poor results, whereas the optimal pressure to dispense ice cream at these temperatures is a very limited window.

The constant pressure will poorly dispense if the pressure is set too high as the flow will be too fast. If the product is too cold and pressure is set too low then the flow will be too slow. Poorly experienced operator in hot climates and with cabinet doors being often open will make the situation even worst.

The poor extrusion comes from too fast flow at warm temperatures/low ice cream viscosities. At cold temperatures and high viscosities the ice cream dispenses too slow at lower pressure this also does not permit good flow and good extrusion.

A variable pressure during dispensing solves this problem.

The invention claimed is:

1. A method for dispensing a frozen confection, the method comprising:
    providing a refrigerated, insulated chamber, which houses at least one container, containing a frozen confection at a temperature of −12° C. or below; wherein the at least one container has an outlet which is closed by a self-closing valve; wherein the container comprises flexible bag containing the frozen confection located inside a bottle;
    pressurising gas in the region inside the bottle and outside the flexible bag thereby applying pressure to the frozen confection so that the valve opens and the frozen confection is forced out of the container through the outlet;
    releasing the pressure so that the valve closes wherein the pressure applied to the frozen confection is varied by the operator during dispensing.

2. A method according to claim 1 wherein the frozen confection is ice cream.

3. A method according to claim 1 wherein the refrigeration system is capable of maintaining the chamber and its contents to a temperature of below −15° C.

4. A method according to claim 1 wherein the self-closing valve is a slit valve made from a resilient material.

5. An apparatus for dispensing a frozen confection, the apparatus comprising:
    a refrigerated, insulated chamber, which houses at least one container, suitable for containing a frozen confection at a temperature of −12° C. or below;
    the at least one container comprising a flexible bag for containing the frozen confection located inside a bottle having an outlet which is closed by a self-closing valve;
    means for pressurising gas in the region inside the bottle and outside the flexible bag thereby applying pressure to the frozen confection so that the valve opens and the frozen confection is forced out of the container through the outlet;
    wherein the means for applying pressure to the frozen confection allows the operator to vary the applied pressure during dispensing.

6. An apparatus according to claim 5 wherein the refrigeration system is capable of maintaining the chamber and its contents to a temperature of below −15° C.

7. An apparatus according to claim 5 wherein the self-closing valve is a slit valve made from a resilient material.

* * * * *